United States Patent
Eisenmann et al.

(10) Patent No.: US 6,577,142 B2
(45) Date of Patent: *Jun. 10, 2003

(54) PROCESS FOR THE CAPACITIVE OBJECT DETECTION IN THE CASE OF VEHICLES

(75) Inventors: Lutz Eisenmann, Vierkirchen (DE); Yan Lu, Freising (DE); Sivart Sauer, Munich (DE); Christian Marschner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/796,671

(22) Filed: Mar. 2, 2001

(65) Prior Publication Data

US 2001/0019272 A1 Sep. 6, 2001

(30) Foreign Application Priority Data

Mar. 3, 2000 (DE) .......................... 100 10 532

(51) Int. Cl.$^7$ .............................. G01R 27/26
(52) U.S. Cl. .................... 324/674; 73/862.626; 701/45; 340/562
(58) Field of Search ........................ 324/674; 701/45; 180/271; 340/562, 870.37; 73/862.626

(56) References Cited

U.S. PATENT DOCUMENTS

| 3,740,567 A | 6/1973 | Atkins | 340/573.1 |
|---|---|---|---|
| 4,796,013 A | * 1/1989 | Yasuda et al. | 340/562 |
| 5,166,679 A | 11/1992 | Vranish et al. | 340/870.37 |
| 5,525,843 A | 6/1996 | Hoewing | 307/9.1 |
| 6,158,768 A | * 12/2000 | Steffens et al. | 280/735 |
| 6,218,632 B1 | * 4/2001 | McCarthy et al. | 177/144 |
| 6,335,684 B1 | * 1/2002 | Eisenmann et al. | 340/562 |

FOREIGN PATENT DOCUMENTS

| DE | 19547842 | 6/1997 |
|---|---|---|
| DE | 19612626 | 10/1997 |
| DE | 196 38 550 | * 3/1998 |
| EP | 0993993 | 4/2000 |
| WO | 97/29391 | 8/1997 |
| WO | 98/22836 | 5/1998 |
| WO | 99/59003 | 11/1999 |

OTHER PUBLICATIONS

Search Report EP 01 10 3139 of Feb. 12, 2002.

* cited by examiner

Primary Examiner—Diego Gutierrez
Assistant Examiner—Etienne P LeRoux
(74) Attorney, Agent, or Firm—Crowell & Moring LLP

(57) ABSTRACT

In a process for capacitive object detection in a vehicle seat, capacitors arranged in the backrest and in the seat surface are influenced by an object. The capacitors are acted upon by alternating voltage, and the time variation of their capacitances is determined individually. From the values of each of the two capacitances, an evaluation of the object is derived by means of a value table and, when the two evaluations correspond to one another concerning the type of an object, an occupant protection system assigned to the seat is correspondingly activated.

8 Claims, 1 Drawing Sheet

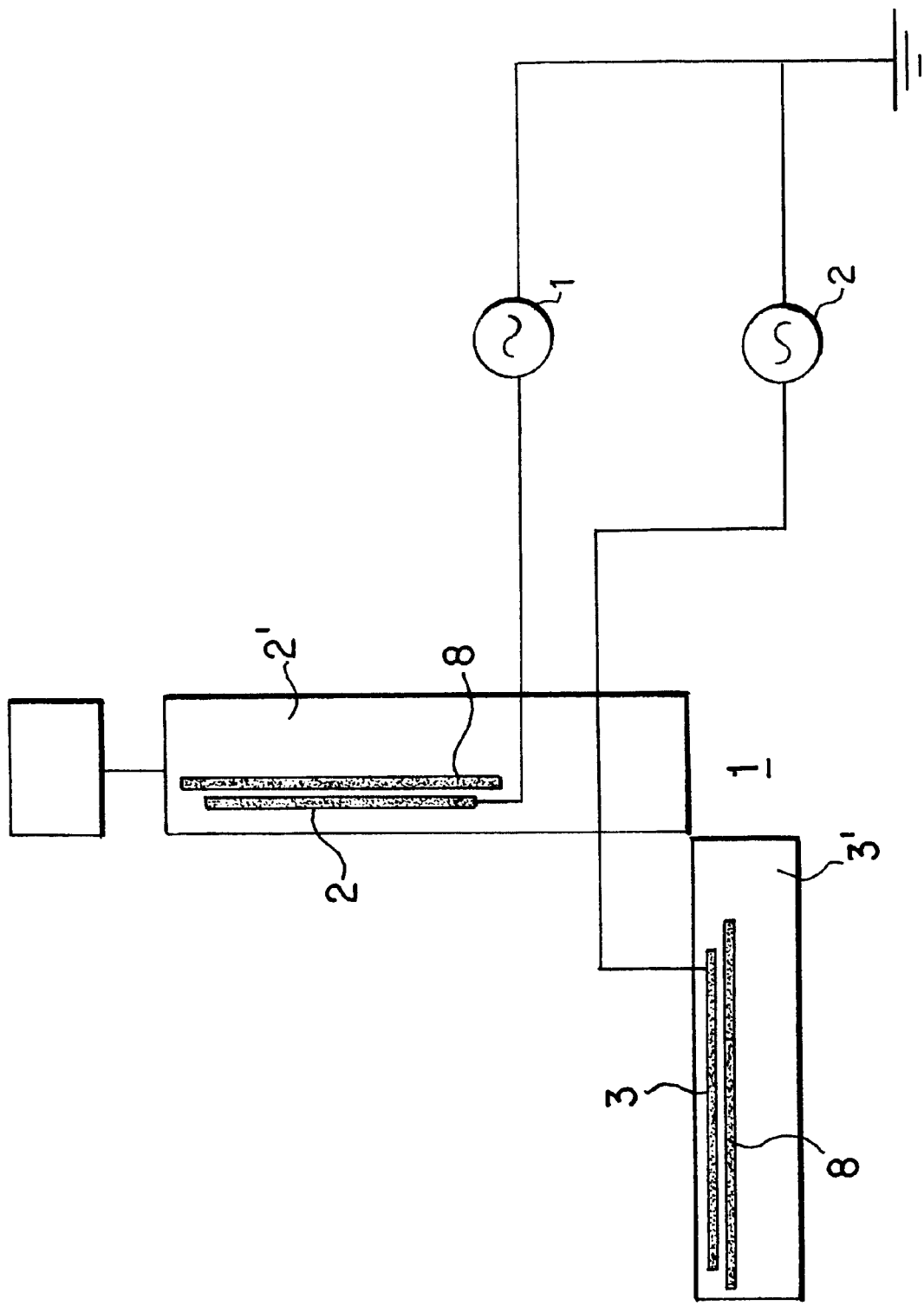

PROCESS FOR THE CAPACITIVE OBJECT DETECTION IN THE CASE OF VEHICLES

BACKGROUND AND SUMMARY OF THE INVENTION

This application claims the priority of German patent document 100 10 532.7, filed Mar. 3, 2000, the disclosure of which is expressly incorporated by reference herein.

The invention relates to a process for detecting an object using capacitive detector elements.

Capacitive object detection processes are disclosed, for example, in International Patent Document WO 99/59003 A and German Patent Document DE 19612626 A. In principle, two capacitors (usually plate shaped) are arranged adjacent to the object that is to be detected. For detecting whether or not a vehicle seat is occupied, the capacitors are situated in the upholstery, for example, in the seating and in the backrest. In this case, the detection is used for triggering safety devices, such as air bags or the like, only when the seat is, in fact, occupied.

When a person is present, the capacitance of the capacitors changes because of a human being's relatively good conducting capacity. To differentiate between a person and a child seat, the capacitance values must be observed and be evaluated by means of an algorithm.

It is an object of the present invention to provide a process of the initially mentioned type which, with low equipment expenditures, supplies precise information concerning not only the presence of an object but also about which object is involved.

This and other objects and advantages are achieved by the detection process according to the invention, capacitors arranged in the backrest and in the seat surface are influenced by an object. The capacitors are acted upon by alternating voltage, and the time variation of their capacitances is determined individually.

In a first process according to the invention, two evaluations are derived by means of a value table and are compared with one another. If the two evaluations correspond with respect to the type of the object, the safety device is controlled as required (that is, triggered; or for example in the case of a rebound child seat or in the case of an unoccupied seat, it is not triggered).

In the second process according to the invention, the two evaluations are mathematically related to one another, and based on the value resulting from the mathematical relationship, a decision table is used to determine whether, as required, an occupant protection device assigned to the seat is activated. The mathematical relationship can preferably be an averaging or an adding of the two evaluations. Only an overall evaluation is used here.

It is important for both processes that the variation in time of the capacitances, and thus the information concerning the type of the object, is followed. Thus, the result of the decision as to whether, as required, the occupant protection system should be activated can also be examined with respect to its variation in time.

Finally, the decision to activate the occupant protection system as required can be annulled only after a set time has expired during which a decision is constantly present which prevents the activation of the occupant protection system.

Other objects, advantages and novel features of the present invention will become apparent from the following detailed description of the invention when considered in conjunction with the accompanying drawings.

RIEF DESCRIPTION OF THE DRAWINGS

The FIGURE is a schematic representation of a switching arrangement in conjunction with an embodiment of the invention.

DETAILED DESCRIPTION OF THE DRAWINGS

In a schematically illustrated vehicle seat 1, capacitors 2 and 3, situated in the backrest 2' and in the seat surface part 3', respectively are each acted upon by alternating voltages $V_1$ and $V_2$. In practice, an alternating-voltage frequency between 10 and 150 kHz, preferably 50 kHz, was found to be expedient.

Each capacitor 2 and 3 is shielded by an electrically conductive plate 8, in order to achieve a directional effect toward the measured object is achieved. (Compare U.S. Pat. No. 5,166,679A).

The capacitance values ($C_{ext-i}$, i=1,2,) of the two equally large capacitors 2 and 3 are determined. From these values, the values $C_{vacant-i}$ (i=1,2) for the vacant seat are subtracted. (The latter were determined beforehand for the various types of seats.) From these two differential values, the resulting $C_{obj-i}$ are used to determine a classification.

Every 500 ms, a new set of two values of $C_{obj-i}$ is determined. Based on these two values, an assignment table is used (also every 500 ms) to determine an actual estimation (rating), as to what is situated on the seat. The assignment table is determined for the respective type of seat beforehand by means of capacitance measurements for various types of configurations (various types and arrangements of child seats, persons of different heights and different weights with different clothing and different sitting postures). When correspondingly scaled, the assignment table supplies a value between −1 (seat definitely vacant) to +1 (seat definitely occupied by a person) for each of the two seat components 2' and 3'.

Generally, a high capacitance $C_{obj-i}$ indicates that a person is situated in the seat; a low capacitance or no capacitance is typical of an unoccupied vehicle seat or of a vehicle seat occupied by an occupied or unoccupied child seat. In this case, for example, a frontal air bag should not be triggered. In the case of a person of a normal sitting posture and with normal clothing, high capacitances of approximately the same amount (approximately 40 pF) are in each case obtained at the capacitors 2 and 3.

However, as a result of the occupant's movements, the rating can vary considerably. For example, when he or she bends forward, particularly the rating_backrest can even assume negative values, and can therefore correspond to the rating of a child seat. Together with an occupant's very heavy clothing or an orthopaedic ball mat arranged on the seat, incorrect static information concerning the respective object could then temporarily be derived.

The invention eliminates this effect by analyzing the time variable values of the rating_i. The principle of the invention consists of ignoring time variations of the rating_i to a certain degree when previously a person was definitely detected (set). Only when the person leaves the vehicle, will a reset take place.

At the start of the vehicle, the rating is in the set=0 condition. When a person enters, rating_i rises above zero. In the ideal case (a person of a normal height and a normal weight is leaning against the backrest and is relaxed), the sum of rating_1+rating_2 will be equal to 2 (person). However, only when the has been continuously above a certain threshold of, for example, 1.5, for a certain time, will the person be considered as definitely detected and the condition becomes set=1. If at first the person is not completely sitting, the rating can then still rise when the person sits more favorably. In this case, it can be provided to trigger the condition set=1 after an exceeding of a threshold value larger than 1.5 (for example, 1.75), after a time period which is shorter than the time period in which the threshold value 1.5 is continuously exceeded. The larger threshold value will only be definitely and continuously exceeded when the presence of the person is still more definite.

The transition from set=1 to set=0 (reset) takes place when the rating falls below a reset threshold for a preset time period, of, for example, 0.5.

Because of the significantly greater movements of a person on the backrest, the set and reset threshold are considered separately according to rating_backrest and rating_seat. The set and reset thresholds for rating_backrest and rating_seat are determined separately by experiments and need not necessarily be identical. Thus, for example, the set threshold for the rating_backrest may be at 1.2. However, the set threshold for the rating_seat is at 1.5.

If no clear information can be obtained in this manner, the capacitive sensor system used for the evaluation is supplemented by means of a sensor system of a completely different type (for example, weight determination).

This results in reliable information concerning the type of object and the safety measure to be taken, if required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for object detection in a vehicle seat, using first and second capacitors arranged respectively in a backrest and in a seat surface of said vehicle seat, said capacitors having respective capacitances which are influenced by presence of an object, said process comprising:

energizing the capacitors with an alternating voltage;

determining time variation of capacitance of each capacitor individually;

from time variable values of each of the first and second capacitances, determining first and second evaluations of the object by means of a value table;

when the first and second evaluations correspond to one another with respect to object type, an occupant protection system assigned to the seat is correspondingly activated.

2. The process according to claim 1, wherein a result of the decision as to whether the occupant protection system can be activated, is also examined with respect to its time variation.

3. The process according to claim 2, wherein a decision to activate the occupant protection system is annulled only after expiration of a set time period during which a decision has constantly been present which prevents activation of the occupant protection system.

4. A process for object detection in a vehicle seat, using first and second capacitors arranged respectively in a backrest and in a seat surface of said vehicle seat, said capacitors having respective capacitances which are influenced by an object, said process comprising:

energizing the capacitors with an alternating voltage;

determining time variation of capacitance of each capacitor individually;

from time variable values of the first and second capacitances, determining first and second evaluations of the object by means of a value table;

relating the two evaluations to one another mathematically, to determine a resulting value; and based on the resulting value from the mathematical relationship, using a decision table to determine whether an occupant protection system assigned to the seat can be activated.

5. The process according to claim 4, wherein a result of the decision as to whether the occupant protection system can be activated, is also examined with respect to its time variation.

6. A process for detecting an object in a vehicle seat using at least one capacitive detector element, said process comprising:

detecting time variation of output signals from said at least one capacitive detector element;

evaluating occupancy of said vehicle seat depending on said time variation of said output signals;

wherein a currently set evaluation from said evaluating step is reset to a different evaluation only when said output signals crosses a preset threshold value and maintains a value which does not again cross the threshold value for a predetermined period of time.

7. The process according to claim 6, wherein said evaluating step changes from a seat occupied evaluation to a seat unoccupied evaluation only when said signal falls below a first threshold value and remains there for a first predetermined time period.

8. The process according to claim 7, wherein said evaluating step changes from a seat unoccupied evaluation to a seat occupied evaluation only when said signal rises above a second threshold value and remains there for a second predetermined time period.

* * * * *